March 20, 1956  S. ROSIN  2,738,708
MICROSCOPE-ILLUMINATION DEVICE
Filed June 28, 1952
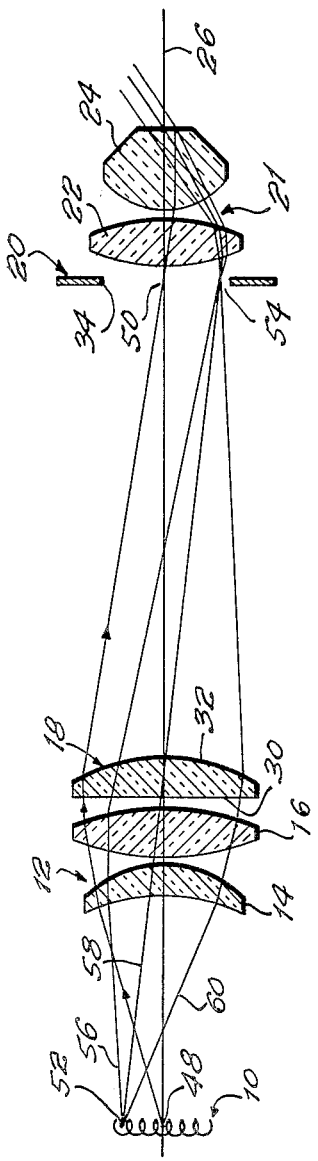
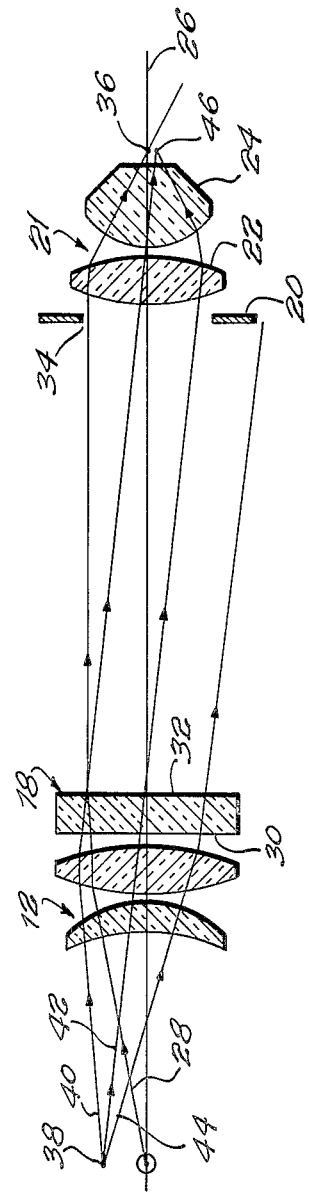
INVENTOR.
SEYMOUR ROSIN
BY Edwin Levisohn +
Harry Cole
ATTORNEYS

United States Patent Office 2,738,708
Patented Mar. 20, 1956

2,738,708

MICROSCOPE-ILLUMINATION DEVICE

Seymour Rosin, New York, N. Y., assignor to Scopicon, Inc., Bronx County, N. Y., a corporation of New York Application June 28, 1952, Serial No. 296,145

3 Claims. (Cl. 88—40)

The present invention relates generally to illuminators of the type used with microscopes, although not limited thereto.

One object of the invention is to provide an illuminator which increases the total amount of light available to the final image by utilizing the maximum possible portion of the light output of the light source.

Another object is to provide an illuminator wherein provision is made for leveling out, neutralizing or eliminating any imperfections or irregularities in the light source.

A further object is generally to provide an improved illuminator for microscopes.

A still further object is an illuminator having provision to focus an image of an elongated light source in the plane of the diaphragm associated with the substage condenser of a microscope.

The above and other objects, features and advantages of the present invention will be more fully understood from the following description considered in connection with the accompanying illustrative drawings.

In the drawings:

Fig. 1 is a more or less diagrammatic illustration of the path of light through an optical system, pursuant to the present invention, the light source and the various lenses being illustrated in longitudinal section; and Fig. 2 is a cross-sectional view of the optical system illustrated in Fig. 1.

Referring now to the drawings in detail, the illuminator of the present invention comprises a light source 10, a suitable conventional primary condenser 12 constituted, as here shown, by the lenses 14 and 16, and a plano-convex cylindrical lens 18. It will be understood that the illuminator will be assembled in proper relation in a suitable housing, not shown, and that lenses 14, 16 and 18 will ordinarily be mounted in a lens tube. A conventional substage condenser of a microscope, constituted by the lenses 22 and 24, is indicated by the reference numeral 21, and is provided with an adjustable iris diaphragm 20. In order to simplify the drawings, the lenses of the condensers 12 and 21 have been illustrated on a common horizontal optical axis. However, it will be understood that when the illuminator is used with a microscope, the axis of lenses 22 and 24 is vertically disposed and intersects the optical axis of the illuminator, and a suitable reflector is provided to reflect the light from the illuminator through the diaphragm 20 into the substage condenser 21. It will also be understood that the illuminator may be used in conjunction with a microscope projector of the type shown, for example, in Patent No. 2,477,396 to Edwin C. Weiskopf, dated July 26, 1949, in which case the optical axis of lenses 14, 16 and 18 will be vertically disposed.

The light source 10 is constituted, as here shown, by a light radiator having an effective length which is many times the magnitude of its width, for example, a single coil filament or a ribbon filament of a suitable lamp, or the long narrow bore of a high intensity discharge tube. Referring now to Fig. 2, the axis of the optical system is indicated at 26, and it will be noted that the light source or radiator 10 is positioned on said axis. Light rays from the light source 10, which are in a plane at right angles to the longitudinal axis of said source, pass through the lenses of the primary condenser 12 which collimate said light rays, as is well known to those skilled in the art. More particularly, it will be understood that a light ray, such as that indicated at 28, which passes through the lenses of the primary condenser 12 will be rendered parallel to the axis 26.

Pursuant to the present invention, provision is made for the lens means 18 which, as here shown, comprises a plano-convex cylindrical lens having its planar surface 30 at the output of the primary condenser. However, it will be understood that it is not necessary that lens 18 be plano-convex or that a plane face thereof is oriented as shown in Fig. 1, the only requirement is that convex power be present in lens 18 in the arrangement illustrated in Fig. 1 and that such convex power be absent from the arrangement shown in Fig. 2. As will be readily apparent from Fig. 2, the planar surface 30 and the cylindrical surface 32 of lens 18 are parallel in cross-section so that lens 18 functions as a plane parallel plate in cross-section. Therefore, it will be apparent that the light ray 28, which is disposed in a horizontal plane, although rendered parallel to the axis 26 by the primary condenser 12, will not be refracted or affected by the lens 18 as it passes therethrough. Said light ray 28 then passes through the aperture 34 in the diaphragm 20 onto the substage condenser 21, provided with lenses 22 and 24, to be focused thereby on the stage of a microscope (not illustrated), as indicated at 36.

For purposes of discussion only, in order to clearly set forth the operation of the invention, it will be assumed that an imaginary light source 38 is provided in the optical system, said source being disposed off the axis 26, as illustrated in Fig. 2. Light rays from said imaginary source, disposed in a horizontal plane, are indicated at 40, 42 and 44, respectively. Said latter light rays are also collimated by the primary condenser 12 and pass through the lens 18 which has no effect thereupon since, as previously indicated, said lens 18 functions as a plane parallel plate in horizontal cross-section. It will be noted however, that the light rays 40, 42 and 44 are inclined to the axis 26 after being collimated by the primary condenser 12. It will be noted also that the light ray 44 does not enter the opening 34 in the iris diaphragm so that it will be readily apparent that a considerable portion of the light rays from the imaginary source 38 does not pass through the diaphragm. However, those light rays from source 38 which do pass through the diaphragm 20, traverse the substage condenser lenses 22 and 24 and are focused thereby at point 46 to form an image on the microscope stage. It will be noted that the focal point 46 is displaced laterally of the focal point 36 on the axis 26. If a line drawn through the light sources 10 and 38 represented an actual object, for example a coil filament, said object would be exactly imaged at a line drawn through the focal points 36 and 46, where it would be seen in the field of the microscope. This represents what is actually seen in the field of a microscope using the customary type of illuminator, which is not provided with plano-convex cylindrical lens means 18, so that the image is focused by the substage condenser 21 in the field of the microscope. Therefore, it will be readily understood that the lens 18 has no effect whatsoever upon light rays disposed in horizontal planes, it being again noted that the light point or source 38 is purely imaginary and does not exist in an actual illuminator, the light source 10 being substantially quite small in horizontal cross-section, so that there are no portions thereof which are appreciably displaced from the axis 26 whereby substantially all the rays thereof, in horizontal planes, pass through the diaphragm aperture 34.

Referring now to Fig. 1, it will be understood that the curvature of the cylindrical surface 32 is figured to image the axial point 48 on the light source 10 at point 50 in the aperture 34 of the diaphragm 20. The point 52 adjacent the upper end of the light source 10 is imaged at point 54 in the aperture of diaphragm 20. More specifically, the light rays 56, 58 and 60 from the point 52 are disposed in a vertical plane, said rays being collimated by the lenses of the primary condenser 12 and then being focused by the lens 18 at the point 54 in the aperture of the diaphragm 20. Therefore, it will be understood that the light source is imaged in the plane of the diaphragm. Consequently, it will be readily apparent that the image of the light source 10 is non-coherent for a vertical plane as it is in focus at the aperture of the diaphragm so that it is completely out of focus at the microscope stage, while for a horizontal plane it is in focus at 36, as previously described.

From the foregoing, it will be readily apparent that the plano-convex cylindrical lens 18 is well adapted to accomplish the various objects previously set forth. Firstly, more light enters the substage condenser 21 and is, therefore, delivered to the image at the microscope stage. This is accomplished by the action of lens 18 in focusing the light rays in the plane of the diaphragm so that substantially all of the light from the light source 10 passes through the aperture 34 of the iris diaphragm. Secondly, it will be noted that the light provided at the microscope stage is non-coherent. More specifically, all of the light rays in horizontal planes for focused at the microscope stage in view of the fact that no portion of the light source 10, in transverse section, is substantially off the axis 26, and all of the light rays from the light source 10, which are disposed in vertical planes, are completely out of focus at the microscope stage, whereby all irregularities or imperfections which are inherent in the light source 10 are leveled or smoothed out. In view of the foregoing advantages, the utilization of the plano-convex cylindrical lens 18 in an illuminator provides a highly improved illuminator for use with microscopes, although, as previously indicated, it will be understood that its utility is not limited thereto.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent, is:

1. In a microscope having a substage condenser and a diaphragm provided with an opening therein through which light passes to said substage condenser, an illuminator for supplying light to said substage condenser through said diaphragm opening along a given axis, comprising an elongated light source having its longitudinal axis disposed perpendicular to said given axis, a first lens means for collimating light emanating from said light source into rays parallel to said given axis, and a second lens means disposed between said first lens means and said diaphragm, said second lens means being effective for focusing in the plane of said diaphragm light rays disposed in planes parallel to and including the plane defined by said given axis and said longitudinal axis of said light source, whereby to increase the amount of light passing through said opening to said substage condenser, said second lens means being further effective for transmitting collimated light rays disposed in planes perpendicular to said first mentioned planes substantially without refraction, whereby light passing to said substage condenser is collimated and out of focus to insure that a focused image of the light source will not be magnified by said microscope.

2. In a microscope having a substage condenser and a diaphragm provided with an opening therein through which light passes to said substage condenser, an illuminator for supplying light to said substage condenser through said diaphragm opening along a given axis, comprising an elongated light source having its longitudinal axis at right angles to said given axis, a first lens means for collimating light emanating from said light source into rays parallel to said given axis, and a cylindrical lens disposed between said first lens means and said diaphragm and oriented so light rays disposed in planes parallel to and including the plane defined by said given axis and said longitudinal axis are focused in the plane of said diaphragms and light rays disposed in planes perpendicular to said first mentioned planes are transmitted through said cylindrical lens substantially without refraction whereby said last mentioned light rays are collimated when reaching said substage condenser, whereby a relatively large percentage of light is transmitted to said substage condenser in a non-focused collimated condition.

3. In a microscope having a substage condenser and a diaphragm provided with an opening therein through which light passes to said substage condenser, an illuminator for supplying light to said substage condenser through said diaphragm opening along a given axis, comprising an elongated light source having its longitudinal axis at right angles to said given axis, condenser lens means adjacent said light source for collimating light emanating therefrom into rays extending parallel to said given axis, a cylindrical lens disposed between said condenser lens means and said diaphragm, the cylindrical axis of said cylindrical lens means being disposed at right angles to the plane defined by said given axis and said longitudinal axis and intersecting said given axis, said cylindrical lens means being effective for focusing in the plane of said diaphragm light rays disposed in planes parallel to and including the plane defined by said given axis and said longitudinal axis of said light source, whereby to increase the amount of light passing through said opening to said substage condenser, said cylindrical lens means being further effective for transmitting collimated light rays disposed in planes perpendicular to said first mentioned planes substantially without refraction, whereby light passing to said substage condenser is collimated and out of focus to insure that a focused image of the light source will not be magnified by said microscope.

References Cited in the file of this patent

UNITED STATES PATENTS

| 1,269,496 | Orange | June 11, 1918 |
| 1,758,049 | Kohler | May 13, 1930 |
| 1,953,299 | Grant | Apr. 3, 1934 |
| 2,180,031 | Carlson | Nov. 14, 1939 |
| 2,193,422 | Jeffree | Mar. 12, 1940 |
| 2,345,602 | Holman | Apr. 4, 1944 |

FOREIGN PATENTS

| 475,776 | Great Britain | Nov. 25, 1937 |

OTHER REFERENCES

The Photographic Journal of America, volume L, No. 5, May 1935, page 303, figure 1.